J. F. O'CONNOR.
SHOCK ABSORBER FOR VEHICLES
APPLICATION FILED APR. 1, 1918.
1,303,950.
Patented May 20, 1919.
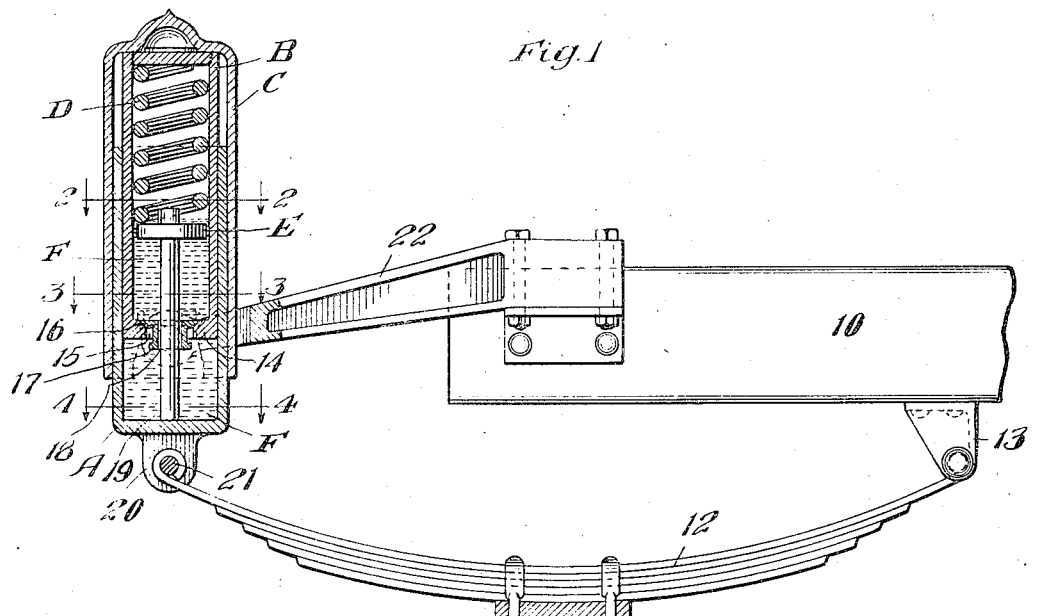
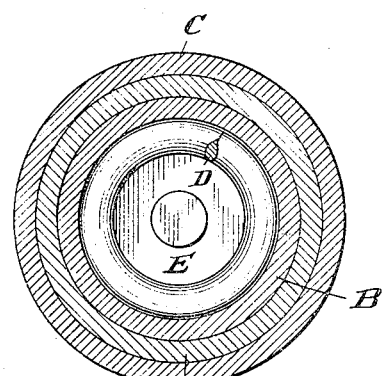
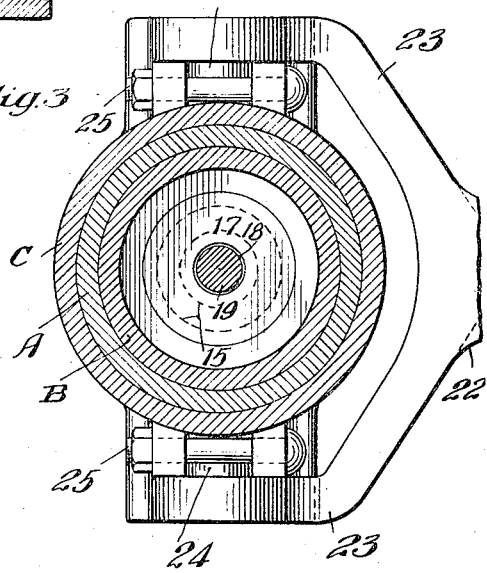
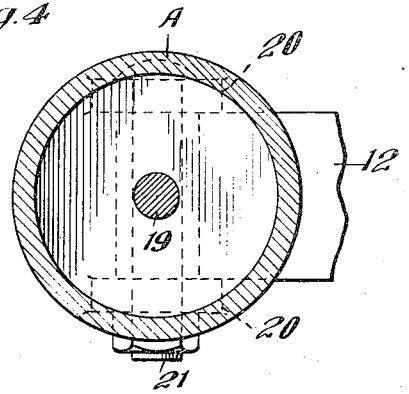
INVENTOR.
John F. O'Connor
BY George I. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK-ABSORBER FOR VEHICLES.

1,303,950.  Specification of Letters Patent.  Patented May 20, 1919.

Application filed April 1, 1918. Serial No. 225,884.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbers for Vehicles, of which the following is a full, clear, concise, and exact description, reference being had to the accompanying drawings, forming a part of this specification.

This invention relates to improvements in shock absorbers for vehicles.

The object of the invention is to provide an efficient, smoothly acting, neat and compact shock absorber, more particularly adapted for attachment to automobiles, motor trucks and similar vehicles.

In the drawing forming a part of this specification, Figure 1 is a part side elevational view, part vertical section of portions of an automobile chassis and axle showing my improvements in connection therewith. And Figs. 2, 3 and 4 are enlarged, horizontal, sectional views, taken on the lines 2—2, 3—3 and 4—4 of Fig. 1.

In said drawing, 10 denotes a portion of an automobile chassis, 11 an axle and 12 a semi-elliptic main spring. The spring 12 is secured to the chassis 10 at one of its ends, as by the bracket 13.

My improved shock absorber is interposed between the chassis and the opposite end of the spring 12, as clearly appears from the drawing. The shock absorber, as shown, includes three cylindrical members A, B and C, a spring D, a piston element E and a quantity of liquid, such as oil F.

The cylindrical member A is closed at its bottom end, as clearly shown in Fig. 1 and the innermost cylindrical member B is closed at its upper end, the open ends of said members A and B being telescoped with a snug sliding fit. The member B at its lower end is provided with an inwardly extended flange 14 which is centrally recessed, as indicated at 15, to provide a somewhat restricted communicating opening between the chambers formed in the members A and B for the oil F. On its upper face, the flange 14 is suitably beveled, as indicated at 16, to form a seat for a check-valve 17, the latter being extended through the opening 15 and itself being centrally recessed, as indicated at 18, to loosely accommodate the rod 19 of the piston element E.

The spring D is confined within the member B between the upper end of the latter and the piston E. The piston E, which is loosely mounted within the member B to permit the oil to pass by, together with the bottom flange 14 of the member B, serves to form a liquid chamber within the member B, and it is obvious that a corresponding chamber is formed within the member A.

The member A is suitably connected to the spring 12 as by the depending flanges 20 and pin 21 and the outer cylindrical member C, which fits down over the member B and is telescoped with the member A, is connected to the chassis 10 by a bracket 22 having forked outer ends 23—23, each of the latter having a trunnion 24 seated in a suitable bearing recess on the outer side of the member C and held in position by any desirable means, such as the bolt 25.

The parts are so designed that the spring D in normal condition of the automobile, will be preferably half compressed, or, stated in another manner, should the spring D have a total action of six inches, it would preferably be under a three-inch compression under normal conditions and as illustrated in Fig. 1. Furthermore, the permissible movement of the piston E within the member B and of the member B with respect to the member A is made to correspond with the further permissible compression of the spring.

In operation, upon relative approach of the chassis and axle, it is evident that the telescoped members A and C will be further telescoped which in turn will cause further telescoping of the members A and B. This will compress the spring D, the pressure from which will be transmitted to the member A through the piston E and its rod 19. At the same time, oil from the chamber in the member A will be transferred fairly readily into the chamber of the member B and part of the oil will pass to the top of the piston E, although the flow will be restricted, as will be apparent. Upon the recoil, the spring D will expand, thereby forcing the two members B and C away from the member A and some of the oil within the member B will be transferred back to the chamber within the member A but during this operation, the flow will be quite restricted due to the fact that the check-valve 17 will be forced to its seat and the transference of oil will be limited substantially to the opening surrounding the rod 19 in the check-valve.

With the arrangement shown, danger of the oil spilling or leaking out is substantially eliminated, since escape of the oil would have to be by way of going over the top edge of the member A and then finally downwardly below the lower edge of the member C. Also, I obtain an easy cushioning action and the capacity can be made to suit varying conditions.

I claim:—

1. In a shock absorber, the combination with three telescoped members each of which is closed at one of its ends, two of said members facing in one direction and the third in the opposite direction, the latter being telescoped between the first two, of a piston within the innermost member and having a pressure-transmitting rod extending to and directly engaging the intermediate telescoped member, a spring interposed between said piston and the closed end of the innermost member, a centrally disposed check-valve carried by the innermost member at its inner end, and liquid confined between the piston and said check-valve in the innermost member and liquid confined between the check-valve and the closed end of the intermediate member.

2. In a shock absorbing device of the character described, the combination with two telescoped cylinders each having their outer ends closed, of a loose piston disposed within the inner telescoped cylinder, a piston rod extending from said piston to and engaging the closed end of the outer cylinder, spring means interposed between said piston and the closed end of the inner cylinder, liquid confined within the two cylinders, and a check valve governing passage of liquid from the interior of one cylinder to the interior of the other cylinder, said liquid being adapted also to pass by said loose piston within the inner cylinder.

In witness that I claim the foregoing I have hereunto subscribed my name this 28th day of Mar., 1918.

JOHN F. O'CONNOR.